US012644324B2

(12) United States Patent
Gera et al.

(10) Patent No.: US 12,644,324 B2
(45) Date of Patent: Jun. 2, 2026

(54) SLIDING DOOR FITTING

(71) Applicant: Häfele SE & Co KG, Nagold (DE)

(72) Inventors: Szabolcs Antal Gera, Biatorbágy (HU); Lajos Bartoss, Budapest (HU)

(73) Assignee: Häfele SE & Co KG, Nagold (DE)

( * ) Notice: Subject to any disclaimer, the term of this patent is extended or adjusted under 35 U.S.C. 154(b) by 0 days.

(21) Appl. No.: 19/079,327

(22) Filed: Mar. 13, 2025

(65) Prior Publication Data

US 2025/0207447 A1 Jun. 26, 2025

Related U.S. Application Data

(63) Continuation of application No. PCT/EP2023/075403, filed on Sep. 15, 2023.

(30) Foreign Application Priority Data

Sep. 16, 2022 (DE) ..................... 20 2022 105 232.8

(51) Int. Cl.
*E05D 15/10* (2006.01)

(52) U.S. Cl.
CPC .. *E05D 15/1042* (2013.01); *E05D 2015/1055* (2013.01); *E05D 2015/1063* (2013.01); *E05D 2015/1071* (2013.01); *E05Y 2201/684* (2013.01); *E05Y 2900/20* (2013.01)

(58) Field of Classification Search
CPC .............................................. E05D 2015/1063
See application file for complete search history.

(56) References Cited

U.S. PATENT DOCUMENTS

| | | | | |
|---|---|---|---|---|
| 3,510,983 A * | 5/1970 | Barabas | E06B 3/4645 | 49/130 |
| 4,565,031 A * | 1/1986 | Sakamoto | E05D 15/1042 | 49/130 |
| 4,644,690 A * | 2/1987 | Caimi | E05D 15/1042 | 49/128 |
| 4,704,819 A * | 11/1987 | Tutikawa | E05D 15/1042 | 49/213 |

(Continued)

FOREIGN PATENT DOCUMENTS

| | | | |
|---|---|---|---|
| CH | 616720 A5 * | 4/1980 | E05D 15/1065 |
| DE | 3619775 A1 * | 12/1987 | E05F 15/635 |

(Continued)

*Primary Examiner* — Catherine A Kelly
(74) *Attorney, Agent, or Firm* — Orbit IP, LLP; Marc G. Martino

(57) ABSTRACT

A sliding door fitting guides a first and a second sliding door. A first and a second guide element can each be connected to the first sliding door. Via a guide arrangement, the first and the second guide element can be guided between a first closed and first open position. The guide arrangement has a central and a first end module releasably connected to one another. The central module has a first transfer element adjustable between a moved-in and an extended position. In the moved-in position of the first transfer element, the first guide element is held in the first closed position and, in the extended position, is arranged on the guide arrangement and displaced in the direction of the first open position. The second guide element can be displaced on the first end module from the second closed position in the direction of the second open position.

19 Claims, 7 Drawing Sheets

(56) References Cited

U.S. PATENT DOCUMENTS

| | | | | |
|---|---|---|---|---|
| 7,845,116 | B2 * | 12/2010 | Masuda | E05D 15/1065 49/128 |
| 7,849,633 | B2 * | 12/2010 | Oshima | E05D 15/1065 49/404 |
| 8,438,783 | B2 * | 5/2013 | Giovannetti | E05D 15/10 49/130 |
| 8,745,925 | B2 * | 6/2014 | Halfon | E05F 17/00 49/118 |
| 2006/0225357 | A1 * | 10/2006 | Bortoluzzi | E05D 15/1042 49/213 |
| 2015/0068124 | A1 * | 3/2015 | Fornasari | E05D 15/08 49/130 |

FOREIGN PATENT DOCUMENTS

| | | | | | |
|---|---|---|---|---|---|
| DE | 37 31 123 | A1 | | 3/1988 | |
| EP | 3 272 981 | A1 | | 1/2018 | |
| EP | 3 519 655 | B1 | | 11/2021 | |
| FR | 2603939 | A1 | * | 3/1988 | E06B 3/4672 |
| FR | 2909403 | A1 | * | 6/2008 | E05D 15/1065 |
| GB | 764158 | A | * | 12/1956 | E05D 15/1042 |
| IT | PN20130051 | A1 | * | 3/2015 | E05D 15/1042 |
| WO | 2008/074945 | A2 | | 6/2008 | |
| WO | 2013/178240 | A1 | | 12/2013 | |
| WO | 2014/083415 | A1 | | 6/2014 | |
| WO | 2018/065871 | A1 | | 4/2018 | |

* cited by examiner

SLIDING DOOR FITTING

CROSS-REFERENCE TO RELATED APPLICATIONS

This continuation application claims priority to PCT/EP2023/075403 filed on Sep. 15, 2023, which has published as WO 2024/056844 A1, and also the German application number DE 20 2022 105 232.8 filed on Sep. 16, 2022, the entire contents of which are fully incorporated herein with these references.

DESCRIPTION

Field of the Invention

The present invention relates to a sliding door fitting for guiding a sliding door, and to a furniture item with a sliding door fitting of this type.

Background of the Invention

The object of a sliding door fitting for a furniture item is to guide the movement of the sliding door from a first position, in which the sliding door is open and the furniture item is accessible, toward a second position, in which the sliding door is closed and the furniture item is locked. In addition, sliding door fittings can assume the task of supporting the sliding door and in the process supporting the weight force acting on the sliding door.

DE 3731123 A1 discloses a sliding door fitting for guiding a sliding door, with an upper guide which consists of two parts which are symmetrical with respect to one another. The two parts are each produced in one piece, for example by means of drop forging.

SUMMARY OF THE INVENTION

Proceeding herefrom, the present invention is based on the object of providing a sliding door fitting for guiding a first sliding door and a second sliding door, which sliding door fitting can be used variably with low part complexity, and of specifying a furniture item with a sliding door fitting of this type.

In order to achieve the object on which the invention is based, a sliding door fitting for guiding a first sliding door and a second sliding door is proposed, comprising: a first guide element and a second guide element which can each be connected to the first sliding door, and a guide arrangement, via which the first guide element can be guided from a first closed position into a first open position, and via which the second guide element can be guided from a second closed position into a second open position.

The guide arrangement preferably has a central module and a first end module which are connected to one another at least indirectly, in particular, releasably, wherein the central module comprises a first transfer element which can be adjusted between a moved-in position and an extended position, wherein, in the moved-in position of the first transfer element, the first guide element is held in the first closed position and, in the extended position of the first transfer element, is arranged such that it can be displaced on the guide arrangement in the direction of the first open position, and the second guide element can be displaced on the first end module from the second closed position in the direction of the second open position. This measure has the advantage that the complex guide functions are integrated into the central module and the end module. The length of the sliding door fitting can be set by the fact that the central module and the end module are connected directly or indirectly to one another. In this way, a variable-length sliding door fitting is proposed, the part complexity or number of parts of which is reduced.

In one possible embodiment, the second guide element can be guided and/or supported by the central module in the second open position.

In a further possible embodiment, the guide arrangement can comprise a first guide rail, on which the first guide element can be displaced between the first closed position and the first open position. In addition, the guide arrangement can comprise a second guide rail, on which the second guide element can be displaced between the second closed position and the second open position. The first transfer element of the central module can comprise a first part portion of the first guide rail. In addition, the first transfer element of the central module can comprise a first part portion of the second guide rail. In particular, the first part portion of the first guide rail and the first part portion of the second guide rail can be arranged parallel to one another.

In the moved-in position of the first transfer element, the first guide element can be guided on the first part portion of the first guide rail, wherein the first guide element is held in the first closed position. In the extended position of the first transfer element, the first guide element can be displaceable from the first part portion of the first guide rail toward the first open position.

In the extended position of the first transfer element, the second guide element can be displaceable from the second closed position via the first part portion of the second guide rail toward the second open position.

The central module can comprise at least in portions a first transfer portion of the first guide rail. Via the first transfer portion of the first guide rail, the first guide element can be transferable from the first closed position into the first open position.

The first end module can comprise a first transfer portion of the second guide rail. Via the first transfer portion of the second guide rail, the second guide element can be transferable from the second closed position into the second open position.

In one possible embodiment, the central module and the first end module can be connected to one another via a first intermediate module. The central module can be connected, in particular, releasably to the first intermediate module. As an alternative or in combination, the first intermediate module can be connected releasably to the first end module.

The first intermediate module can comprise a first intermediate portion of the first guide rail. In addition, the first intermediate module can comprise a first intermediate portion of the second guide rail. The first intermediate portion of the first guide rail and the first intermediate portion of the second guide rail can be arranged parallel to one another.

In one possible embodiment, the central module can be arranged at least partially in a central plane of the guide arrangement, in particular, a plane of symmetry of the guide arrangement. The central plane is to be understood to mean that plane which divides the longitudinal extent of the sliding door fitting into parts of equal length.

In one possible embodiment, the sliding door fitting can comprise a third guide element and a fourth guide element which can each be connected to the second sliding door. Here, the guide arrangement can be configured in such a way that the third guide element can be guided from a third closed position into a third open position, and the fourth guide element can be guided from a fourth closed position into a fourth open position. Here, the guide arrangement can have a second end module which is connected to the central module at least indirectly, in particular, releasably. In addition, the central module can comprise a second transfer element which can be adjusted between a moved-in position and an extended position, wherein, in the moved-in position of the second transfer element, the third guide element is held in the third closed position and, in the extended position of the second transfer element, is arranged such that it can be displaced on the guide arrangement in the direction of the third open position. In addition, the fourth guide element can be displaceable on the second end module from the fourth closed position in the direction of the fourth open position.

The fourth guide element can be guided by the central module in the fourth open position.

The third guide element can be displaceable on the first guide rail between the third closed position and the third open position. In addition, the fourth guide element can be displaceable on the second guide rail between the fourth closed position and the fourth open position. The second transfer element of the central module can comprise a second part portion of the first guide rail. In addition, the second transfer element of the central module can comprise a second part portion of the second guide rail. The second part portion of the first guide rail and the second part portion of the second guide rail can be arranged parallel to one another, in particular.

In the moved-in position of the second transfer element, the third guide element can be guided on the second part portion of the first guide rail, wherein the third guide element is held in the third closed position. In the extended position of the second transfer element, the third guide element can be displaceable from the second part portion of the first guide rail toward the third open position.

The central module can comprise at least in portions a second transfer portion of the first guide rail, via which the third guide element can be transferred from the third closed position into the third open position.

The second end module can comprise a second transfer portion of the second guide rail, via which the fourth guide element can be transferred from the fourth closed position into the fourth open position.

In one possible embodiment, the central module and the second end module can be connected to one another via a second intermediate module, wherein, in particular, the central module is connected releasably to the second intermediate module, and/or the second intermediate module is connected releasably to the second end module. The second intermediate module can comprise a second intermediate portion of the first guide rail. In addition, the second intermediate module can comprise a second intermediate portion of the second guide rail. The second intermediate portion of the first guide rail and the second intermediate portion of the second guide rail can be arranged parallel to one another here.

In one preferred embodiment of the invention, the guide arrangement comprises a first guide rail, on which the first guide element can be displaced between the first closed position and the first open position, and a first transfer element which can be adjusted between a moved-in position and an extended position. The first guide element has a first support element, into which a part portion of the first guide rail is integrated. In the moved-in position of the first transfer element, two further part portions of the first guide rail are connected to one another via the part portion of the first support element, as a result of which a continuous rail portion of the first guide rail is formed from the three part portions.

In one development of this embodiment, the sliding door fitting comprises a third guide element and a fourth guide element which can each be connected to the second sliding door, wherein the third guide element can be displaced on the first guide rail between a third closed position and a third open position. The guide arrangement comprises a second transfer element which can be adjusted between a moved-in position and an extended position. The third guide element has a third support element, into which a part portion of the first guide rail is integrated. In the moved-in position of the second transfer element, two further part portions of the first guide rail are connected to one another via the part portion of the third support element, as a result of which a continuous rail portion of the first guide rail is formed from the three part portions.

In addition, the object on which the invention is based is achieved by way of a furniture item, comprising: a body and a first sliding door and a second sliding door, and a sliding door fitting according to an above-described type which is connected to the body, wherein the first guide element and the second guide element are each connected to the first sliding door, and/or the third guide element and the fourth guide element are each connected to the second sliding door.

The first sliding door closes the furniture item here when the first guide element is arranged in the first closed position and the second guide element is arranged in a second closed position, and the first sliding door makes the furniture item accessible when the first guide element is arranged in the first open position and the second guide element is arranged in a second open position.

Here, the second sliding door closes the furniture item when the third guide element is arranged in the third closed position and the fourth guide element is arranged in the third closed position, and the second sliding door makes the furniture item accessible when the third guide element is arranged in the third open position and the fourth guide element is arranged in a fourth open position.

BRIEF DESCRIPTION OF THE DRAWINGS

One embodiment of the inventive sliding door fitting will be described in the following text using the drawings of the figures, in which.

DETAILED DESCRIPTION OF EMBODIMENTS OF THE INVENTION

Figure 1:
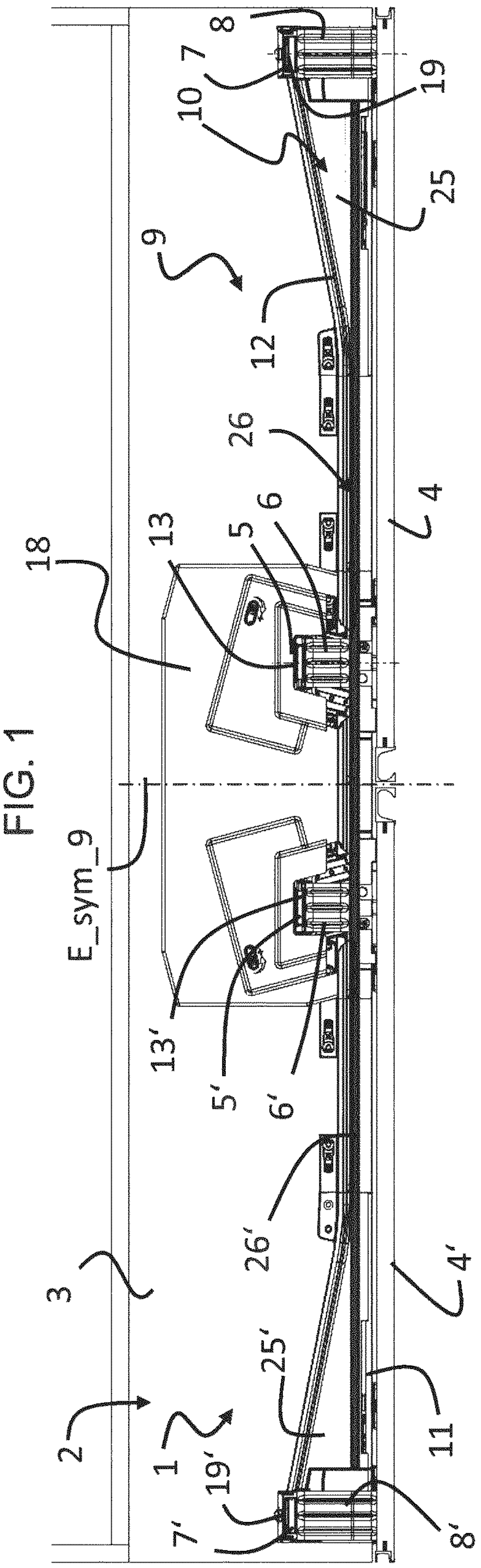
FIG. 1 shows a plan view from above of a furniture item with a first sliding door, a second sliding door and a sliding door fitting according to the invention, wherein the two sliding doors close the furniture item.
Figure 2:
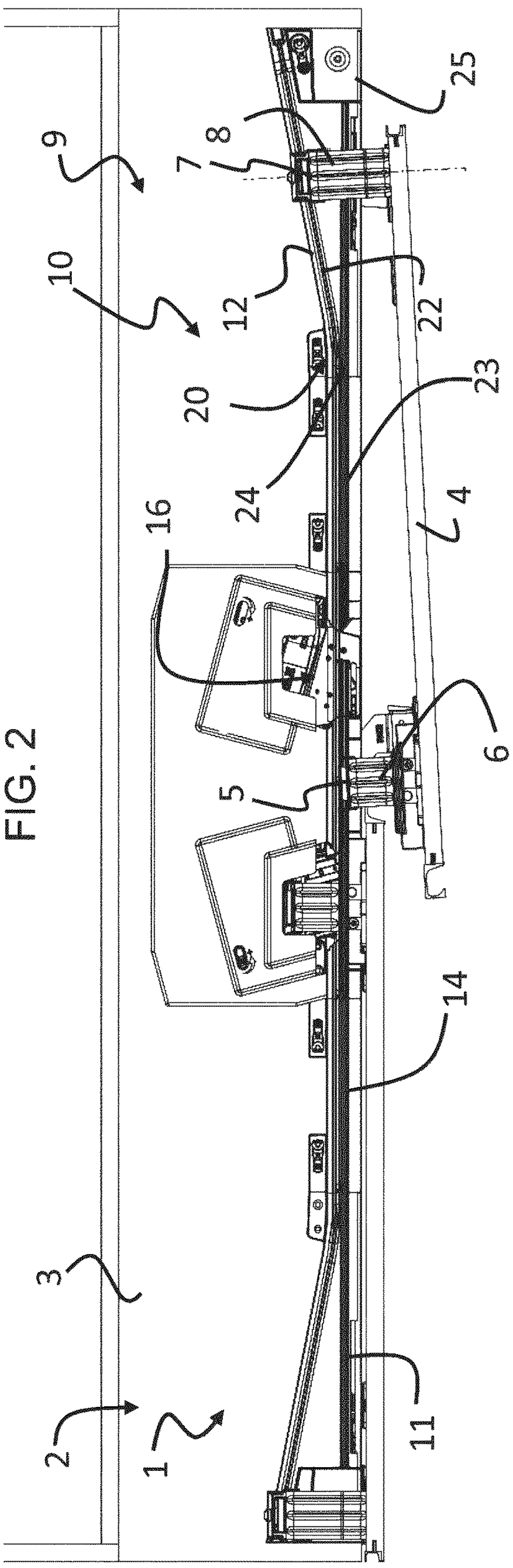
FIG. 2 shows the view from FIG. 1, wherein the first sliding door is arranged in a first partially open position.
Figure 3:
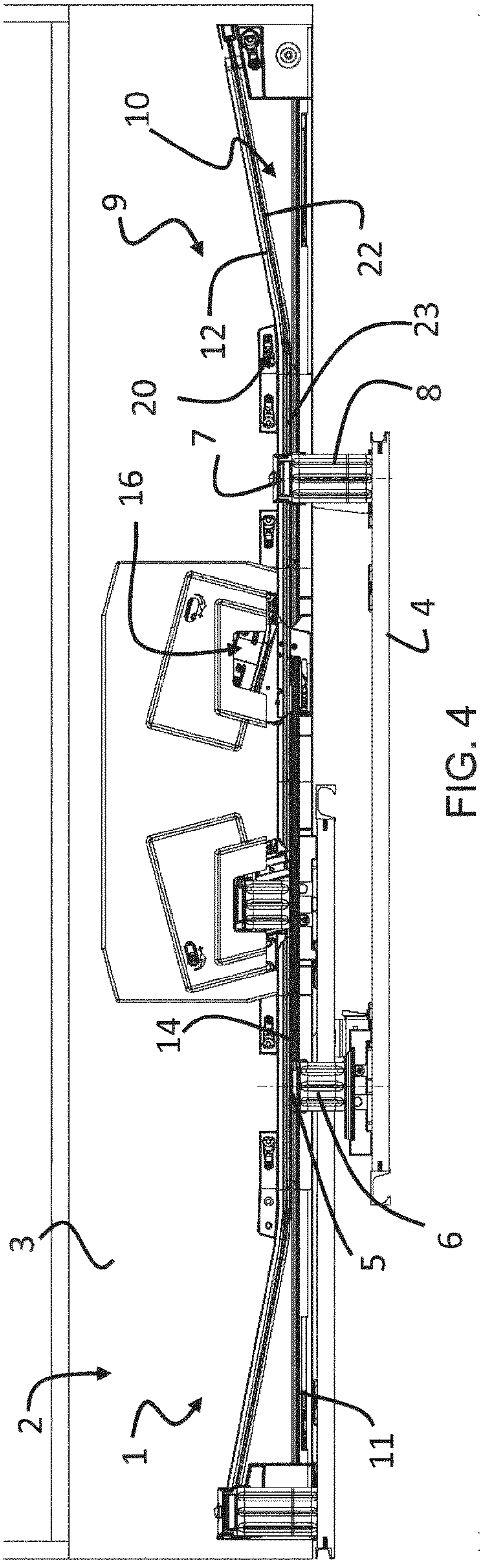
FIG. 3 shows the view from FIG. 1, wherein the first sliding door is arranged in a second partially open position.

FIGS. 1 to 10 which are described together in the following text show a sliding door fitting 1 for a furniture item 2. In the present case, the sliding door fitting 1 is connected fixedly to the upper side of a body 3 of the furniture item 2. The sliding door fitting 1 has a guide arrangement 9 which is configured to guide and/or to support a sliding door arrangement.

In the present case, the sliding door arrangement comprises a first sliding door 4 and a second sliding door 4'. A first guide element 5 is fastened rotatably via a first support element 6 to the first sliding door 4, and a second guide element 7 is fastened rotatably via a second support element 8 to said first sliding door. Here, the first guide element 5 is mounted rotatably about a rotational axis via a bearing on the first support element 6. The second guide element 7 is mounted rotatably about a rotational axis via a bearing on the second support element 8. A third guide element 5' is mounted rotatably about a rotational axis via a third support element 6' to the second sliding door 4', and a fourth guide element 7' is fastened rotatably about a rotational axis via a fourth support element 8' to said second sliding door. The guide elements 5, 5', 7, 7' can each be configured, for example, in the form of a guide roller.

In the case of a closed first sliding door 4, the first guide element 5 is situated in a first closed position and the second guide element 7 is situated in a second closed position. The first sliding door 4 therefore closes the furniture item 2 or that part of the furniture item 2 which is assigned to the first sliding door 4. In the case of an open first sliding door 4, the first guide element 5 is situated in a first open position and the second guide element 7 is situated in a second open position. The first sliding door 4 therefore makes the furniture item 2 or that part of the furniture item 2 which is assigned to the first sliding door 4 accessible.

In the case of a closed second sliding door 4', the third guide element 5' is situated in a third closed position and the fourth guide element 7' is situated in a fourth closed position. The second sliding door 4' therefore closes the furniture item 2 or that part of the furniture item 2 which is assigned to the second sliding door 4'. In the case of an open second sliding door 4', the third guide element 5' is situated in a third open position and the fourth guide element 7' is situated in a fourth open position. The second sliding door 4' therefore makes the furniture item 2 or that part of the furniture item 2 which is assigned to the second sliding door 4' accessible.

The guide arrangement 9 comprises a rail arrangement 10 which has a first guide rail 11 and a second guide rail 12. The first guide rail 11 is arranged between the sliding doors 4, 4' and the second guide rail 12, with the result that the first guide rail 11 can also be called a front guide rail and the second guide rail 12 can also be called a rear guide rail.

The first guide rail 11 is configured in such a way that both the first guide element 5 which is connected to the first sliding door 4 can be guided on a first guide path and the third guide element 5' which is connected to the second sliding door 4' can be guided on a second guide path of the first guide rail 11.

Here, the first guide element 5 which is connected to the first sliding door 4 can follow the first guide path between the first closed position and the first open position. To this end, the first guide rail 11 has a first closure-maintaining portion 13, on which the first guide element 5 is arranged in the first closed position, a first opening-maintaining portion 15, on which the first guide element 5 is arranged in the first open position, and a first transfer portion 14 which connects the first closure-maintaining portion 13 and the first opening-maintaining portion 15 to one another.

The third guide element 5' which is connected to the second sliding door 4' can follow the second guide path between the third closed position and the third open position. To this end, the first guide rail 11 has a second closure-maintaining portion 13', on which the third guide element 5' of the second sliding door 4' is arranged in the third closed position, a second opening-maintaining portion 15', on which the third guide element 5' of the second sliding door 4' is arranged in the third open position, and a second transfer portion 14' which connects the second closure-maintaining portion 13' and the second opening-maintaining portion 15' to one another.

The first guide path and the second guide path of the first guide rail 11 overlap in the region between the first closure-maintaining portion 13 and the second closure-maintaining portion 13'. It goes without saying that the overlapping regions can be of integral configuration with one another. In other words, the first guide element 5 of the first sliding door 4 and the third guide element 5' of the second sliding door 4' can be guided on the same rail portions of the first guide rail 11 in the region between the first closure-maintaining portion 13 and the second closure-maintaining portion 13'.

The second guide rail 12 is configured in such a way that both the second guide element 7 which is connected to the first sliding door 4 can be guided on a first guide path and the fourth guide element 7' which is connected to the second sliding door 4' can be guided on a second guide path of the second guide rail 12.

Here, the second guide element 7 which is connected to the first sliding door 4 can follow the first guide path of the second guide rail 12 between the second closed position and the second open position. To this end, the second guide rail 12 has a first closure-maintaining portion 19, on which the second guide element 7 is arranged in the second closed position, a first opening-maintaining portion 21, on which the second guide element 7 is arranged in the second open position, and a first transfer portion 20 which connects the first closure-maintaining portion 19 and the first opening-maintaining portion 21 to one another.

The first transfer portion 20 has a first part portion 22, a second part portion 23 and a curve portion 24. The first part portion 22 and the second part portion 23 are arranged transversely with respect to one another. The first part portion 22 and the second part portion 23 are connected to one another via the curve portion 24.

The fourth guide element 7' which is connected to the second sliding door 4' can follow the second guide path of the second guide rail 12 between the fourth closed position and the fourth open position. To this end, the second guide rail 12 has a second closure-maintaining portion 19', on which the fourth guide element 7' is arranged in the fourth closed position, a second opening-maintaining portion 21', on which the fourth guide element 7' is arranged in the fourth open position, and a second transfer portion 20' which connects the second closure-maintaining portion 19' and the second opening-maintaining portion 21' to one another. The second transfer portion 20' has a first part portion 22', a second part portion 23' and a curve portion 24'. The first part portion 22' and the second part portion 23' are arranged transversely with respect to one another. The first part portion 22' and the second part portion 23' are connected via the curve portion 24' to one another.

Figure 4:
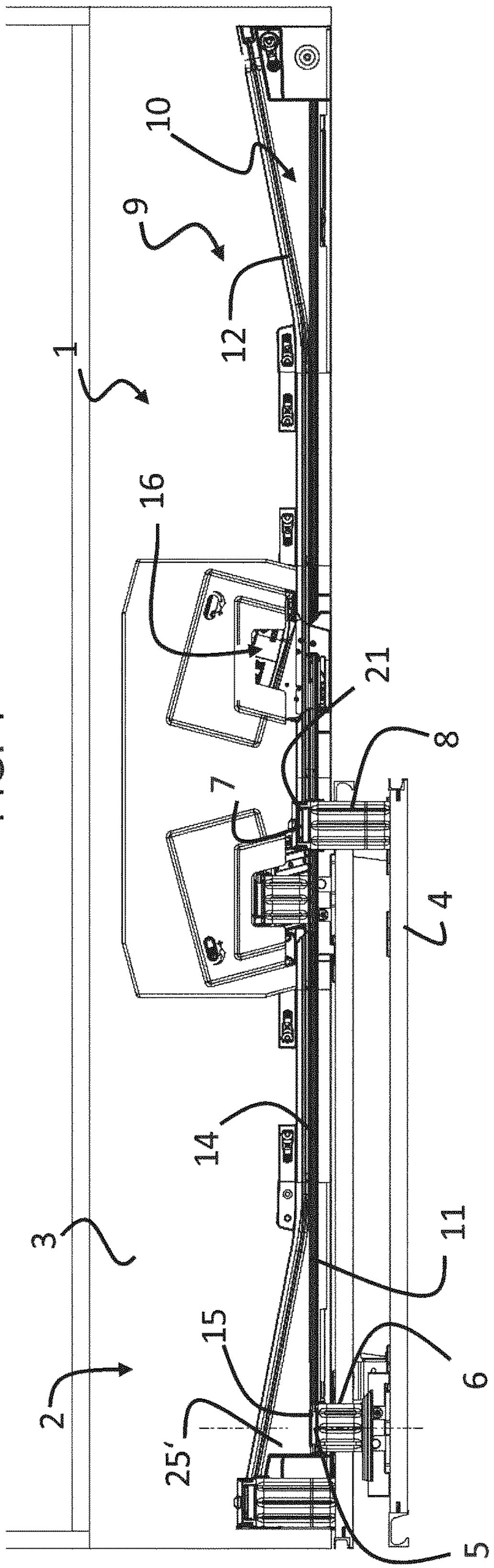
FIG. 4 shows the view from FIG. 1, wherein the first sliding door is arranged in a completely open position.
Figure 5:
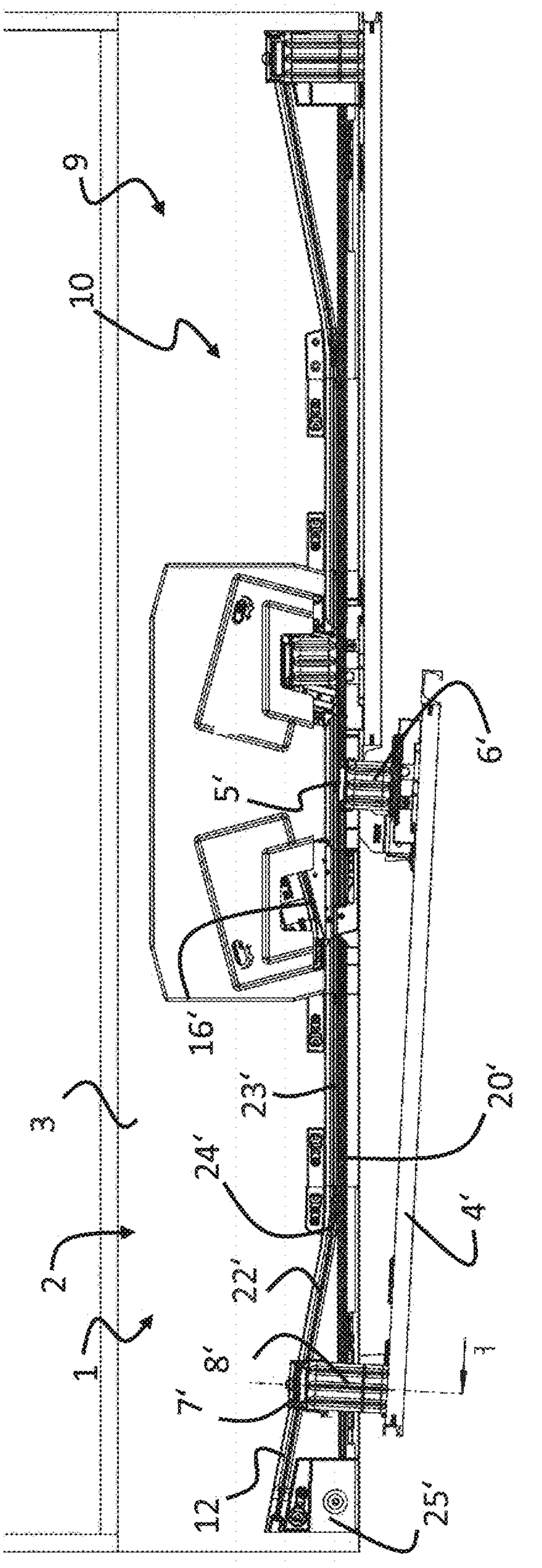
FIG. 5 shows the view from FIG. 1, wherein the second sliding door is arranged in a first partially open position.
Figure 6:
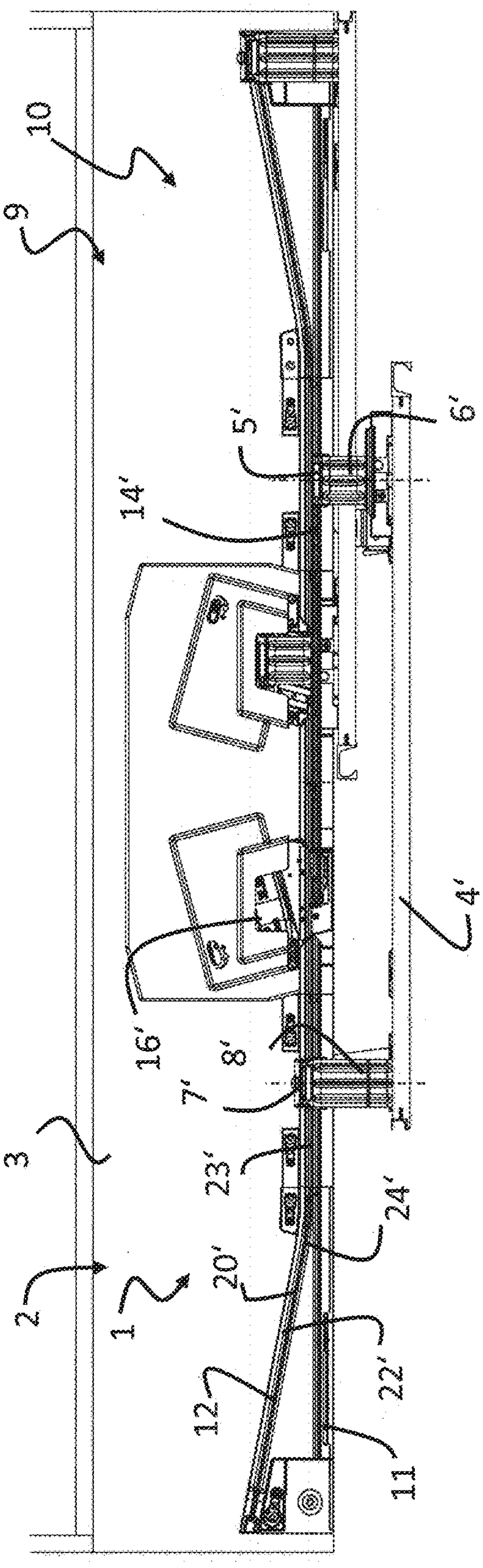
FIG. 6 shows the view from FIG. 1, wherein the second sliding door is arranged in a second partially open position.
Figure 7:
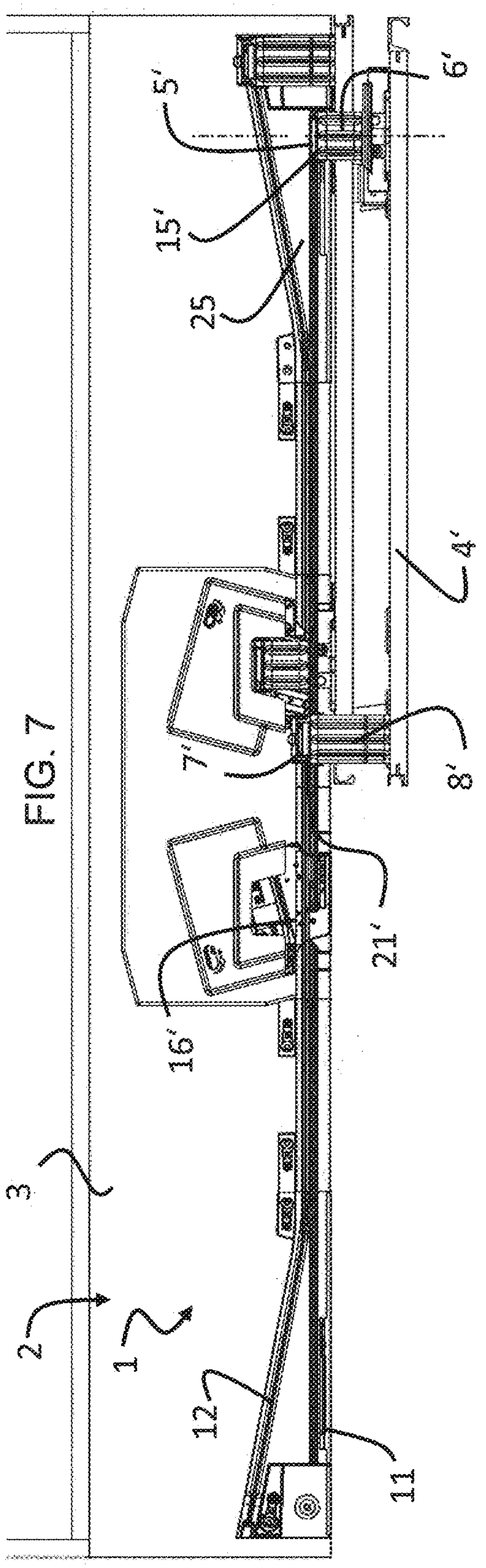
FIG. 7 shows the view from FIG. 1, wherein the second sliding door is arranged in a completely open position.

As can be seen from the comparison of FIGS. 4 and 7, the first guide path and the second guide path of the second guide rail 12 overlap partially. It goes without saying that the overlapping regions can be of integral configuration with one another. In other words, the second guide element 7 of the first sliding door 4 and the fourth guide element 7' of the second sliding door 4' can be guided on the same rail portions of the second guide rail 12 in the overlapping region.

Figure 8:
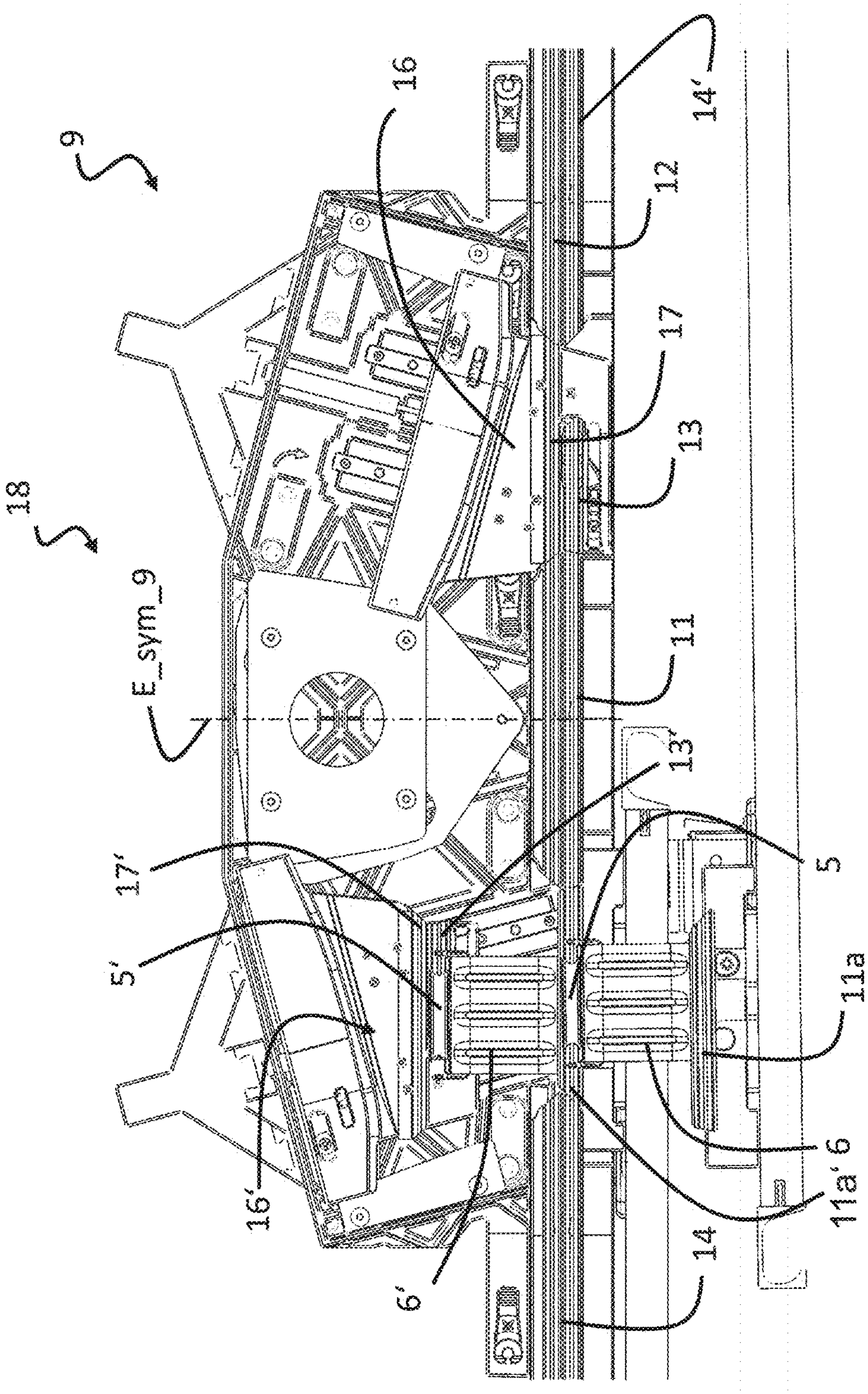
FIG. 8 shows a detailed illustration of the central module of the sliding door fitting from FIG. 1 without a cover.
Figure 9:
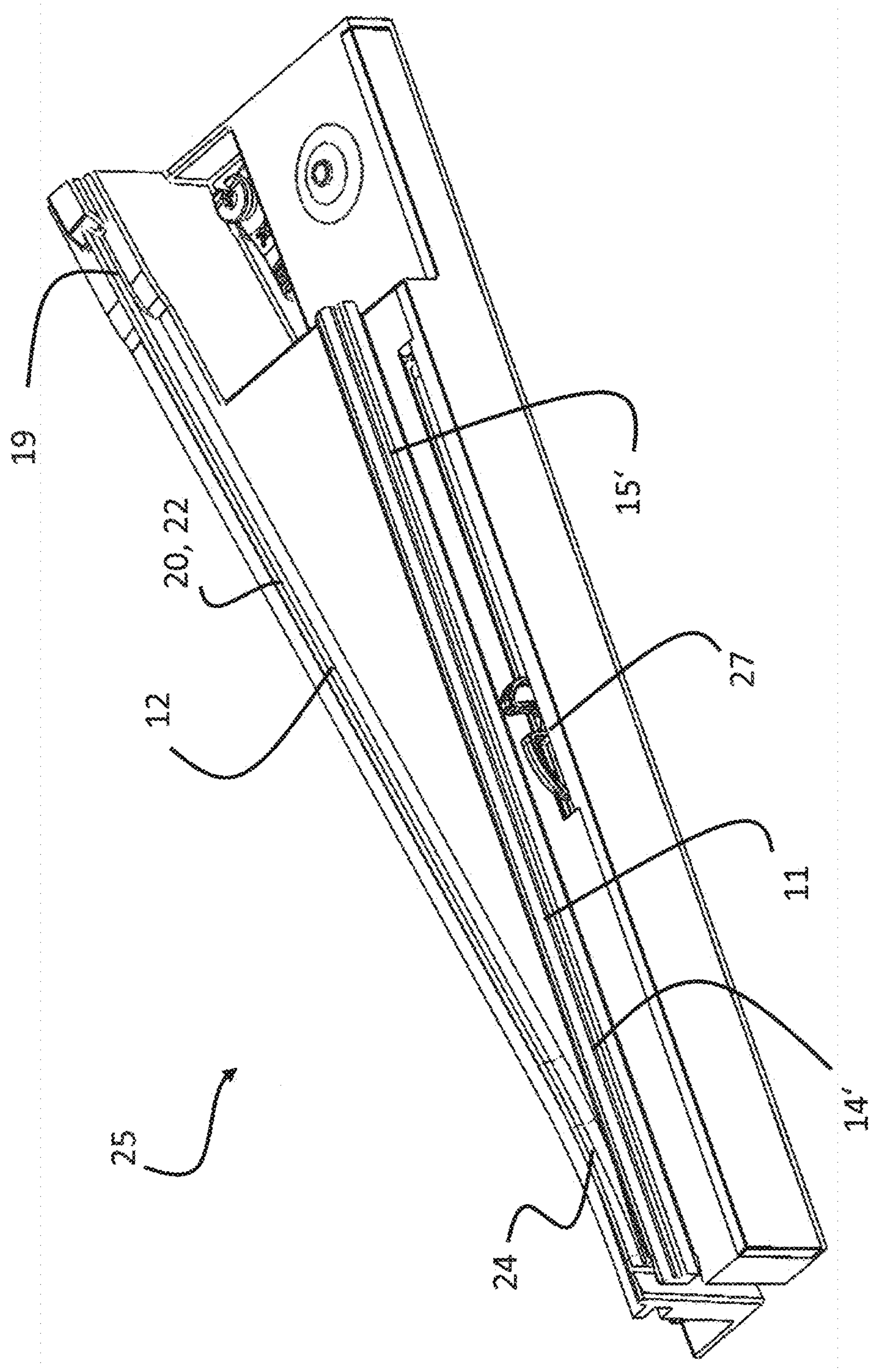
FIG. 9 shows a detailed illustration of the first end module of the sliding door fitting from FIG. 1.
Figure 10:
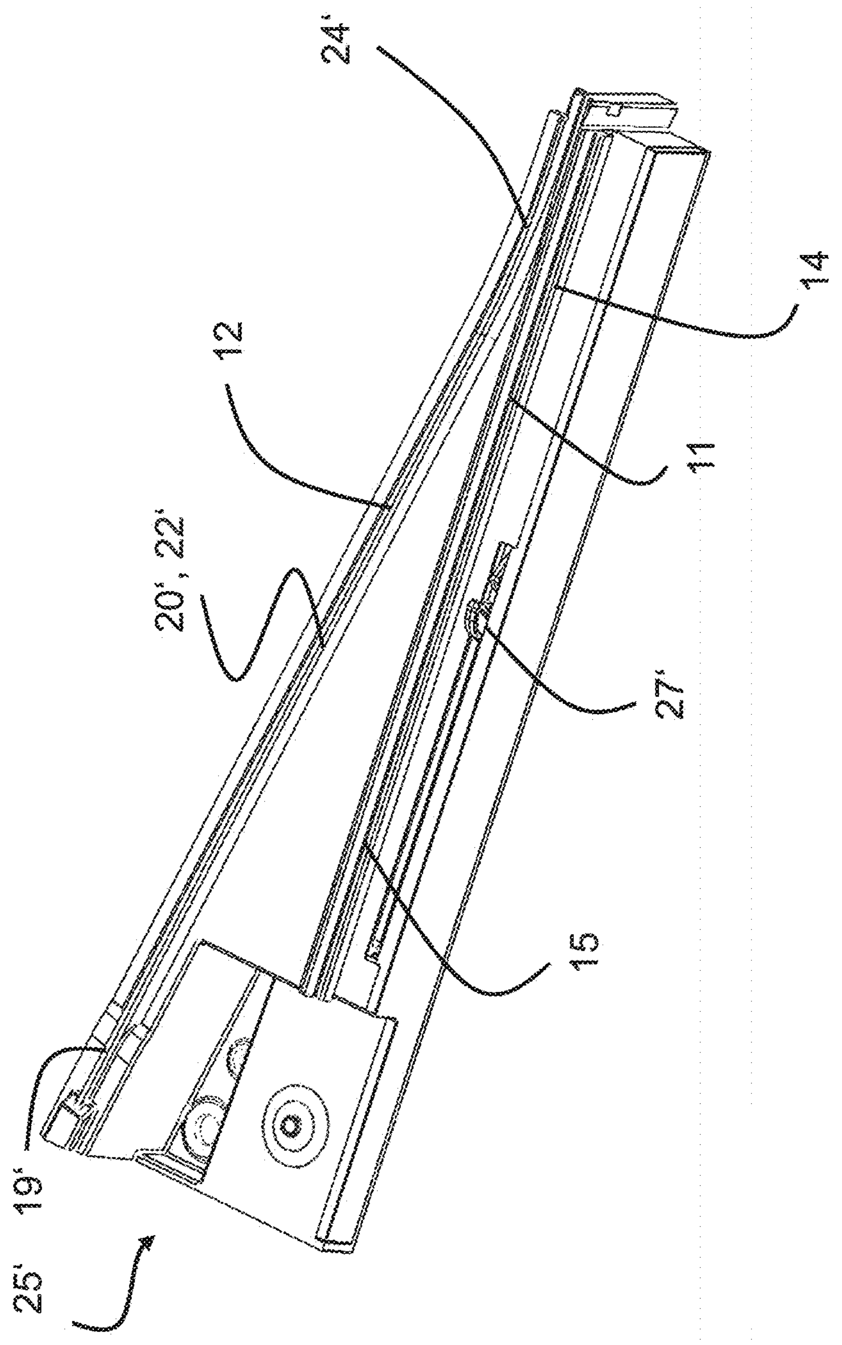
FIG. 10 shows a detailed illustration of the second end module of the sliding door fitting from FIG. 1.

The guide arrangement 9 comprises a central module 18 with a first transfer element 16 which can also be called a slide element. The first transfer element 16 can be adjusted between a moved-in position, as shown in FIG. 1, and an extended position, as shown in FIG. 8, for example. A first part portion of the first guide rail 11, namely the first closure-maintaining portion 13, is integrated into the first transfer element 16. The first guide element 5 is arranged in the first closed position in the moved-in position of the first transfer element 16. In the moved-in position of the first transfer element 16, the first guide element 5 is held on the first closure-maintaining portion 13 of the first guide rail 11 in the first closed position, with the result that a displacement of the first guide element 5 in the direction of the first open position is blocked. In the moved-in position of the first transfer element 16, the first sliding door 4 is arranged in such a way that the furniture item 2 or that part of the furniture item 2 which is assigned to the first sliding door 4 is closed.

In the extended position of the first transfer element 16, the first guide element 5 is arranged on the guide arrangement 9 in such a way that it can be displaced from the first part portion of the first guide rail 11 in the direction of the first open position. Here, in the extended position of the first transfer element 16, the first sliding door 4 is arranged in such a way that the furniture item 2 or that part of the furniture item 2 which is assigned to the first sliding door 4 is at least partially accessible, and the first guide element 5 can be displaced on the first guide rail 11 in such a way that the sliding door 4 is completely opened. In the extended position of the first transfer element 16, the first part portion of the first guide rail 11 is arranged in such a way that a further part portion of the first guide rail 11, namely the first transfer portion 14, adjoins the first part portion, with the result that a continuous rail portion of the first guide rail 11 is formed from the two part portions. In this respect, the central module 18 comprises the first closure-maintaining portion 13 and a part of the first transfer portion 14 of the first guide rail 11.

A first part portion 17 of the second guide rail 12 is integrated into the first transfer element 16. The first closure-maintaining portion 13 and the first part portion 17 of the second guide rail 12 are arranged parallel to one another in the first transfer element 16. In the extended position of the first transfer element 16, the first part portion 17 of the second guide rail 12 is arranged in such a way that two further part portions of the second guide rail 12 are connected to one another via the first part portion 17 of the second guide rail 12, with the result that a continuous rail portion of the second guide rail 12 is formed from the three part portions. Here, a continuous rail portion is to be understood to mean that the guide roller can be guided on the rail portion, wherein possible joints are harmless. In the extended position of the first transfer element 16, the second guide element 7 can be displaced from the second closed position via the first part portion 17 of the second guide rail 12 toward the second open position.

The central module 18 has a damper unit (not shown) for damping the movement of the first transfer element 16.

As shown in FIG. 8, a part portion 11*a* of the first guide rail 11 is integrated into the first support element 6. In the moved-in position of the first transfer element 16, two further part portions of the first guide rail 11 are connected to one another via the part portion 11*a* of the first support element 6, as a result of which a continuous rail portion of the first guide rail 11 is formed from the three part portions. The third guide element 5' can be pushed on this continuous rail portion into the third open position.

The central module 18 has a second transfer element 16' which can be adjusted between a moved-in position and an extended position. In the moved-in position of the second transfer element 16', the third guide element 5' which is connected to the second sliding door 4' is arranged in the third closed position and, in the extended position of the second transfer element 16', can be displaced on the guide arrangement 9 in the direction of a third open position. In the present case, the central module 18 is of mirror-symmetrical configuration with regard to an axis of symmetry E_sym_9. Therefore, the second transfer element 16' is also of mirror-inverted configuration with respect to the first transfer element 16. Identical elements are therefore labeled with identical reference signs together with an apostrophe. For the identical elements, what was said above in the context of the first transfer element 16 applies analogously to the second transfer element 16'.

A second part portion of the first guide rail 11, namely the second closure-maintaining portion 13', is integrated into the second transfer element 16'. In the moved-in position of the second transfer element 16', the third guide element 5' of the second sliding door 4' is arranged in the third closed position. In the moved-in position of the second transfer element 16', the third guide element 5' is held on the second closure-maintaining portion 13' of the first guide rail 11 in the third closed position, with the result that a displacement of the third guide element 5' in the direction of the third open position is blocked. In the moved-in position of the second transfer element 16', the second sliding door 4' is arranged in such a way that the furniture item 2 or that part of the furniture item 2 which is assigned to the second sliding door 4' is closed.

In the extended position of the second transfer element 16', the third guide element 5' of the second sliding door 4' is arranged on the guide arrangement 9 in such a way that it can be displaced from the second part portion of the first guide rail 11 in the direction of the second open position. Here, in the extended position of the second transfer element 16', the second sliding door 4' is arranged in such a way that the furniture item 2 or that part of the furniture item 2 which is assigned to the second sliding door 4' is at least partially accessible, and the third guide element 5' can be displaced on the first guide rail 11 in such a way that the second sliding door 4' is completely opened. In the extended position of the second transfer element 16', the second part portion of the first guide rail 11 is arranged in such a way that a further part portion of the first guide rail 11, namely the second transfer portion 14', adjoins the second part portion, with the result that a continuous rail portion of the first guide rail 11 is formed by the two part portions. In this respect, the central module 18 comprises the second closure-maintaining portion 13' and a part of the second transfer portion 14' of the first guide rail 11.

A second part portion 17' of the second guide rail 12 is integrated into the second transfer element 16'. The second closure-maintaining portion 13' and the second part portion 17' of the second guide rail 12 are arranged parallel to one another in the second transfer element 16'. In the extended position of the second transfer element 16', the second part portion 17' of the second guide rail 12 is arranged in such a way that two further part portions of the second guide rail 12 are connected to one another via the second part portion 17' of the second guide rail 12, with the result that a continuous rail portion of the second guide rail 12 is formed from the three part portions. In the extended position of the second transfer element 16', the fourth guide element 7' of the second sliding door 4' can be displaced from the fourth closed position via the second part portion 17' of the second guide rail 12 toward the fourth open position.

The central module 18 has a damper unit (not shown) for damping the movement of the second transfer element 16'.

As shown in FIG. 8, a part portion 11*a*' of the first guide rail 11 is integrated into the second support element 6'. In the moved-in position of the second transfer element 16', two further part portions of the first guide rail 11 are connected to one another via the part portion 11*a*' of the second support element 6', as a result of which a continuous rail portion of the first guide rail 11 is formed from the three part portions. The first guide element 5 can be pushed on this continuous rail portion into the first open position.

The guide arrangement 9 comprises a first end module 25 and a second end module 25' which each delimit the rail arrangement 10 on the end side.

The first end module 25 comprises the first closure-maintaining portion 19 and a part of the first transfer portion 20 of the second guide rail 12. The first end module 25 comprises, in particular, the first part portion 22 and the curve portion 24 of the first transfer portion 20 of the second guide rail 12. The first end module 25 therefore has the function of bridging a spacing transversely with respect to the longitudinal extent of the sliding door fitting 1 between the second closed position and the second open position. In addition, the first end module 25 comprises the second opening-maintaining portion 15' and a part of the second transfer portion 14' of the first guide rail 11.

The first end module 25 comprises a damper arrangement 27 which is configured to damp the movement of the third guide element 5' of the second sliding door 4' in the direction of the third open position at least in a last part portion of the movement. When the third guide element 5' of the second sliding door 4' comes into contact with the damper arrangement 27, the damper arrangement 27 pulls the third guide element 5' of the second sliding door 4' in the direction of the third open position. The first end module 25 therefore has the function of damping the movement of the second sliding door 4' and/or the third guide element 5' in the direction of the third open position and of pulling the second sliding door 4' and/or the third guide element 5' into the third open position.

The second end module 25' comprises the first opening-maintaining portion 15 and a part of the first transfer portion 14 of the first guide rail 11. In addition, the second end module 25' comprises the second closure-maintaining portion 19' and a part of the second transfer portion 20' of the second guide rail 12. The second end module 25' comprises, in particular, the first part portion 22' and the curve portion 24' of the second transfer portion 20' of the second guide rail 12. The second end module 25' therefore has the function of bridging a spacing transversely with respect to the longitudinal extent of the sliding door fitting 1 between the fourth closed position and the fourth open position.

The second end module 25' comprises a damper arrangement 27' which is configured to damp the movement of the first guide element 5 of the first sliding door 4 in the direction of the first open position at least in a last part portion of the movement. When the first guide element 5 of the first sliding door 4 comes into contact with the damper arrangement 27', the damper arrangement 27' pulls the first guide element 5 of the first sliding door 4 in the direction of the first open position. The second end module 25' therefore has the function of damping the movement of the first sliding door 4 and/or the first guide element 5 in the direction of the first open position and of pulling the first sliding door 4 and/or the first guide element 5 into the open position.

The first end module 25 is connected via a first intermediate module 26 to the central module 18. Here, the first intermediate module 26 is connected on one side releasably to the central module 18 and on the opposite side to the first end module 25. The first intermediate module 26 comprises a part of the second transfer portion 14' of the first guide rail 11 and the second part portion 23 of the first transfer portion 20 of the second guide rail 12. The first guide rail 11 and the second guide rail 12 are arranged parallel to one another in the first intermediate module 26.

The second end module 25' is connected via a second intermediate module 26' to the central module 18. Here, the second intermediate module 26' is connected on one side releasably to the central module 18 and on the opposite side to the second end module 25'. The second intermediate module 26' comprises a part of the first transfer portion 14 of the first guide rail 11 and the second part portion 23' of the second transfer portion 20' of the second guide rail 12. The first guide rail 11 and the second guide rail 12 are arranged parallel to one another in the second intermediate module 26'.

The length of the first intermediate module 26 and the second intermediate module 26 can each be selected in accordance with the length of the furniture item 2. The length of the sliding door fitting 1 can therefore be varied via the at least indirect connection, in particular, by way of the selection of the intermediate modules 26, 26'. It is also conceivable here, in particular, that the intermediate modules 26, 26' are dispensed with and the central module 18 is connected directly to the end modules 25, 25'.

LIST OF REFERENCE SIGNS

1 Sliding door fitting
2 Furniture item
3 Body
4 Sliding door
5 Guide element
6 Support element
7 Guide element
8 Support element
9 Guide arrangement
10 Rail arrangement
11 First guide rail
12 Second guide rail
13 Closure-maintaining portion
14 Transfer portion
15 Opening-maintaining portion
16 Transfer element
17 Part portion of the second guide rail
18 Central module
19 Closure-maintaining portion

20 Transfer portion
21 Opening-maintaining portion
22 Part portion
23 Part portion
24 Curve portion
25 End module
26 Intermediate module
27 Damper arrangement
E Plane

What is claimed is:

1. A sliding door fitting configured for guiding a first sliding door and a second sliding door, comprising:

a first guide element and a second guide element configured to be connected to the first sliding door; and a guide arrangement, via which the first guide element is configured to be guided from a first closed position into a first open position, and via which the second guide element is configured to be guided from a second closed position into a second open position.

2. The sliding door fitting as claimed in claim 1, wherein the guide arrangement has a central module and a first end module which are connected at least indirectly to one another, wherein the central module comprises a first transfer element configured to be adjusted between a moved-in position and an extended position, wherein, in the moved-in position of the first transfer element, the first guide element is held in the first closed position and, in the extended position of the first transfer element, is arranged on the guide arrangement and configured to be displaced in the direction of the first open position, and the second guide element is configured to be displaced on the first end module from the second closed position in the direction of the second open position.

3. The sliding door fitting as claimed in claim 2, wherein the second guide element is guided by the central module in the second open position.

4. The sliding door fitting as claimed in claim 2, wherein the guide arrangement comprises a first guide rail, on which the first guide element is configured to be displaced between the first closed position and the first open position, and a second guide rail, on which the second guide element is configured to be displaced between the second closed position and the second open position.

5. The sliding door fitting as claimed in claim 4, wherein the first transfer element of the central module comprises a first part portion of the first guide rail, and wherein the first transfer element of the central module comprises a first part portion of the second guide rail, wherein, in particular, the first part portion of the first guide rail and the first part portion of the second guide rail are arranged parallel to one another.

6. The sliding door fitting as claimed in claim 5, wherein, in the moved-in position of the first transfer element, the first guide element is guided on the first part portion of the first guide rail, wherein the first guide element is held in the first closed position.

7. The sliding door fitting as claimed in claim 5, wherein, in the extended position of the first transfer element, the first guide element is configured to be displaced from the first part portion of the first guide rail toward the first open position.

8. The sliding door fitting as claimed in claim 5, wherein, in the extended position of the first transfer element, the second guide element is configured to be displaced from the second closed position via the first part portion of the second guide rail toward the second open position.

9. The sliding door fitting as claimed in claim 4, wherein the central module comprises at least in portions a first transfer portion of the first guide rail, via which the first guide element is configured to be transferred from the first closed position into the first open position.

10. The sliding door fitting as claimed in claim 4, wherein the first end module comprises a first transfer portion of the second guide rail, via which the second guide element is configured to be transferred from the second closed position into the second open position.

11. The sliding door fitting as claimed in claim 2, wherein the central module and the first end module are connected to one another via a first intermediate module, and/or wherein the first intermediate module is connected releasably to the first end module.

12. The sliding door fitting as claimed in claim 11, wherein the first intermediate module comprises a first intermediate portion of the first guide rail, and wherein the first intermediate module comprises a first intermediate portion of the second guide rail, wherein the first intermediate portion of the first guide rail and the first intermediate portion of the second guide rail are arranged parallel to one another.

13. The sliding door fitting as claimed in claim 2, wherein the sliding door fitting comprises a third guide element and a fourth guide element which are each configured to be connected to the second sliding door, wherein the guide arrangement is configured in such a way that the third guide element is configured to be guided from a third closed position into a third open position, and the fourth guide element is configured to be guided from a fourth closed position into a fourth open position, wherein the guide arrangement has a second end module which is connected at least indirectly to the central module, wherein the central module comprises a second transfer element which is configured to be adjusted between a moved-in position and an extended position, wherein, in the moved-in position of the second transfer element, the third guide element is held in the third closed position and, in the extended position of the second transfer element, is arranged such that it is configured to be displaced on the guide arrangement in the direction of the third open position, and the fourth guide element is configured to be displaced on the second end module from the fourth closed position in the direction of the fourth open position.

14. The sliding door fitting as claimed in claim 13, wherein, in the fourth open position, the fourth guide element is guided by the central module.

15. The sliding door fitting as claimed in claim 13, wherein the third guide element is configured to be displaced on the first guide rail between the third closed position and the third open position, and wherein the fourth guide element is configured to be displaced on the second guide rail between the fourth closed position and the fourth open position.

16. The sliding door fitting as claimed in claim 1, wherein the guide arrangement comprises a first guide rail, on which the first guide element is configured to be displaced between the first closed position and the first open position, and a first transfer element which is configured to be adjusted between a moved-in position and an extended position, and wherein the first guide element has a first support element, into which a part portion of the first guide rail is integrated, wherein, in the moved-in position of the first transfer element, two further part portions of the first guide rail are connected to one another via the part portion of the first support element and, as a result, a continuous rail portion of the first guide rail is formed from the three part portions.

17. The sliding door fitting as claimed in claim 16, wherein the sliding door fitting comprises a third guide element and a fourth guide element which can each be connected to the second sliding door, wherein the third guide element is configured to be displaced on the first guide rail between a third closed position and a third open position, wherein the guide arrangement comprises a second transfer element which is configured to be adjusted between a moved-in position and an extended position, and wherein the third guide element comprises a third support element, into which a part portion of the first guide rail is integrated, wherein, in the moved-in position of the second transfer element, two further part portions of the first guide rail are connected to one another via the part portion of the third support element and, as a result, a continuous rail portion of the first guide rail is formed from the three part portions.

18. A furniture item, comprising:

a body;

the first sliding door and the second sliding door; and the sliding door fitting as claimed in claim 1 which is connected to the body;

wherein the first guide element and the second guide element are each connected to the first sliding door and/or a third guide element and a fourth guide element are each connected to the second sliding door.

19. The furniture item as claimed in claim 18, wherein the guide arrangement is configured that the third guide element is configured to be guided from a third closed position into a third open position, and the fourth guide element is configured to be guided from a fourth closed position into a fourth open position, wherein the guide arrangement has a second end module which is connected at least indirectly to a central module, wherein the central module comprises a second transfer element which is configured to be adjusted between a moved-in position and an extended position, wherein, in the moved-in position of the second transfer element, the third guide element is held in the third closed position and, in the extended position of the second transfer element, is arranged such that it is configured to be displaced on the guide arrangement in the direction of the third open position, and the fourth guide element is configured to be displaced on the second end module from the fourth closed position in the direction of the fourth open position.

* * * * *